United States Patent [19]

Ma et al.

[11] Patent Number: 5,506,001
[45] Date of Patent: Apr. 9, 1996

[54] METHOD FOR THE PRESERVATION OF TIMBER PRODUCTS

[75] Inventors: Frank M. S. Ma, Charleston, W. Va.; Marcel Ayotte, L'Assomption, Canada

[73] Assignee: Union Carbide Chemicals & Plastics Technology Corporation, Danbury, Conn.

[21] Appl. No.: 466,442

[22] Filed: Jun. 6, 1995

Related U.S. Application Data

[63] Continuation-in-part of Ser. No. 116,056, Sep. 2, 1993, Pat. No. 5,460,751.

[51] Int. Cl.$^6$ .......................... A01N 25/02; C09K 15/02
[52] U.S. Cl. .................. 427/408; 106/15.05; 252/400.5; 424/622; 424/626; 427/297; 427/325; 427/393; 427/397; 427/419.1
[58] Field of Search ................ 106/15.05; 427/297, 427/397, 393, 325, 408, 419.1; 252/400.5; 424/622, 626; 428/541; 514/724

[56] References Cited

U.S. PATENT DOCUMENTS

| | | | |
|---|---|---|---|
| 3,832,463 | 8/1974 | Nicholson | 424/655 |
| 3,957,494 | 5/1976 | Oberley | 106/15.05 |
| 4,247,329 | 1/1981 | Mills | 106/2 |
| 4,313,976 | 2/1982 | Leach | 427/297 |
| 4,323,477 | 4/1982 | Hill | 252/397 |
| 4,567,115 | 1/1986 | Trumble | 428/541 |
| 4,649,065 | 3/1987 | Hein et al. | 106/18 |
| 4,656,060 | 4/1987 | Kryzewski | 427/397 |
| 4,847,002 | 7/1989 | Trumble | 252/400.5 |

FOREIGN PATENT DOCUMENTS 756685  9/1956  United Kingdom.

*Primary Examiner*—Anthony Green
*Attorney, Agent, or Firm*—J. B. Mauro

[57] ABSTRACT

A method of treating wood by impregnation of the wood with wood-treating-compositions containing compounds which contain elements selected from copper, chromium and arsenic (CCA) and oxyalkylene polymer additives provides improved properties to the treated wood, better control of oxyalkylene polymer distribution, and reduced leaching of the CCA.

7 Claims, No Drawings

METHOD FOR THE PRESERVATION OF TIMBER PRODUCTS

This application is a continuation-in-part of application Ser. No. 116,056, filed Sep. 02, 1993, now U.S. Pat. No. 5,460,751.

BACKGROUND OF THE INVENTION

This invention relates to compositions useful for preserving timber products. The timber products to which the present invention is directed are typically foundation piles, utility poles, posts, fences, decks, railroad ties, marina structures and other types of products subject to decay due to insect pests, fungi and weathering. The compositions of the invention provide improved wood-treating solutions having enhanced stability when compared to conventional CCA type solutions. In addition, these compositions, when used to preserve wood products, retard the hardness usually associated with CCA type solutions, resulting in less cracking and improved climbability.

The two main types of preservatives used to treat timber products include oil-based preservatives such as coal tar creosote, solutions of creosote with coal tar or petroleum oils, and solutions of preservative chemicals, such as pentachlorophenol dissolved in a suitable organic carrier; and water-based preservatives such as acid copper chromate solution (ACC), chromated copper arsenate solution (CCA) and ammoniacal copper arsenate solution (ACA). CCA solutions are preferred since they chemically react in the wood to form compounds which are toxic to both fungi and insects.

However, CCA solutions have been known to impart undesirable characteristics to treated wood such as hardening due to chemical fixation of Cr (VI) in the wood, and various attempts have been made to improve CCA type wood-treating solutions to increase softness of the treated wood. In addition, the use of reducing agents or other additives in CCA solutions tends to raise the pH of the solution above about 2, causing premature precipitation of chromated copper arsenate from wood-treating solutions prior to or during use, resulting in unacceptable treated products and significant costs associated with waste disposal or replacement of the solutions.

U.S. Pat. No. 4,567,115 describes a method of treating wood, comprising the step of exposing wood to an aqueous solution consisting essentially of water, hexavalent chromium, copper, arsenic and polyethylene glycol. In a particular embodiment, a 10% concentration of 1000 molecular weight polymer of ethylene glycol (PEG 1000) is added to the standard diluted CCA solution in a manner so that a stable solution is obtained. The useful range of PEG solutions is described as being in the 500 to 2000 molecular weight range.

U.S. Pat. No. 4,847,002, issued to the same inventor of the above patent, describes another attempt at improving the stability of CCA-type solutions. The patent describes a wood preservative solution comprising a CCA-type formulation diluted with water and an added amount of fluoride ion sufficient to stabilize the solution against precipitation without retarding conversion of hexavalent chromium to trivalent chromium in the wood matrix. The patent also claims a wood preserving solution further consisting essentially of polyethylene glycol. The molecular weight range of the polyethylene glycol is between 100 and 2000, in particular 500 to 2,000 and more particularly 1,000.

Advances have been made in improving CCA solutions. However, problems associated with stability of these solutions still exists. In addition, resistance to the use of utility poles treated with CCA persists due to problems associated with hardness of the treated wood and resulting problems associated with cracking of CCA treated wood.

The need exists for stable wood preservative solutions which combine the preservative properties of CCA type solutions with the ease of climbing associated with oil-based solutions, and methods for the utilization of such solutions.

SUMMARY OF THE INVENTION

The present invention relates to improved methods for application of aqueous wood-treating compositions containing compounds which contain elements selected from copper, chromium and arsenic (hereinafter collectively referred to as CCA solutions), and oxyalkylene polymer additives which improve the stability of the solutions. The oxyalkylene polymer additives of the present invention provide improved stability of wood-treating solutions by reducing the rate of formation of solid precipitates, thereby reducing costs associated with rejected treated products and waste disposal costs for destabilized solutions containing precipitates.

The oxyalkylene polymer additives of the present invention also retard hardening of the treated wood, thereby reducing cracking and improving climbability for poles treated with the solutions.

In a preferred embodiment, the wood-treating solutions comprise aqueous CCA solutions containing high molecular weight oxyalkylene polymer additives having hydroxyl numbers of 45 or less. A preferred group of oxyalkylene polymer additives include polyethylene glycols or chemically modified polyethylene glycols having molecular weights of 2,000 or higher, and having hydroxyl numbers of 45 or less.

In another embodiment, the wood-treating solution comprises an aqueous CCA solution containing, as the oxyalkylene polymer additive, polymers based on ethylene oxide (EO) and propylene oxide (PO) monomers in ratios of 1:1 or greater, having hydroxyl numbers of 45 or less. In a preferred embodiment, the EO and PO monomers are in ratios of 1:1. Ratios of less than 1:1 EO:PO are also useful if used in a two-step treating process.

In accordance with another embodiment, the wood-treating solutions comprise aqueous CCA solutions containing, as the oxyalkylene polymer additives, a mixture of the above described polyethylene glycols or modified polyethylene glycols, with the above described ethylene oxide (EO) and propylene oxide (PO) monomers. The mixture of additives is preferably in a ratio of 3:1 of the polyethylene glycols to EO:PO polymers.

Also provided are wood products produced by a process comprising treating wood with an aqueous wood-treating solution comprising a CCA solution and at least one oxyalkylene polymer additive having a hydroxyl number of less than about 45.

DESCRIPTION OF THE PREFERRED EMBODIMENTS

In accordance with the present invention, aqueous wood-treating solutions formulated with compounds containing elements selected from copper, chromium and arsenic (hereinafter collectively referred to as CCA solutions) are stabilized by the addition of oxyalkylene polymer additives having a hydroxyl number of about 45 or less. Suitable oxyalkylene polymer additives include polyethylene glycol, modified polyethylene glycol, ethylene oxide (EO) and propylene oxide (PO) monomers, and mixtures thereof; which when added to the woodtreating solutions, provide improved stability of the solutions and retard the hardening effects associated with CCA solutions..

Examples of preferred aqueous wood-treating solutions useful in the practice of the present invention include Chromated Copper Arsenate (CCA) Types A, B and C. CCA-Type A contains about 16.0– 20.9% copper oxide, about 59.4–69.3% chromium as chromic acid and about 14.7–19.7% arsenic as arsenic pentoxide; Type B contains about 18.0–22.0% copper as copper oxide, about 33.0–38.0% chromium as chromic acid and about 42.0–48.0% arsenic as arsenic pentoxide; and Type C contains about 17.0–21.0% copper as copper oxide, about 44.5–50.5% chromium as chromic acid, and about 30.0–38.0% arsenic as arsenic pentoxide.

Basic CCA standard solutions (American Wood Preservers' Association Standard C4) are well known in the art and are commercially available as concentrated solutions containing from about 45% to 75% active oxides in water. The most common commercially used CCA solution is a 50% aqueous solution containing 23.75% $CrO_3$, 9.25% CuO and 17% $As_2O_5$.

The commercial solutions are normally diluted with water to yield wood-treating solutions containing about 1% to about 10% active oxides. The more preferred concentration for use in the present invention is from about 2% to about 3% CCA in an aqueous solution, most preferably about 2.5% aqueous CCA.

In accordance with the present invention, CCA solutions which contain, as the oxyalkylene polymer additive, polyethylene glycols (PEGs) or modified polyethylene glycols (mPEGs) having hydroxyl numbers of about 45 or less, contribute to improved stability of CCA solutions containing these additives.

Polyethylene glycols (PEGs) are a family of linear polymers formed by the addition reaction of ethylene oxide and are typically represented by the formula:

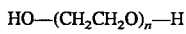

where n is a positive number and represents the average number of repeating oxyethylene groups. Polyethylene glycols are normally designated with a number that represents its average molecular weight. For example, PEG 8000 consists of a distribution of polymers of varying molecular weight with an average molecular weight of 8,000, having an average number of repeating oxyethylene groups (n) of 181≧.

Preferred PEGs include those having molecular weight greater than 2,000 with hydroxyl numbers less than about 45, and most preferred PEGs are those having molecular weights in the range of from about 8,000 to about 100,000 or higher, and hydroxyl numbers of about 45 or less.

Another type of PEG useful in the present invention are chemically modified polyethylene glycols (mPEGs). Typically, mPEGs are prepared by replacing the terminal hydrogen of a hydroxy group of a PEG with, but not limited to, linear or branched $C_1$–$C_{18}$ alkyl or aryl groups. For example, a methyl modified polyethylene glycol would be represented by the following formula:

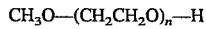

where n is a positive number and represents the average number of repeating oxyethylene groups. Preferred groups for modifying PEGs by replacing the terminal hydrogen of a hydroxy group include methyl, ethyl and butyl. Again, the mPEGs have hydroxyl numbers less than about 45. A most preferred group of mPEGs are those based on replacement of the terminal hydrogen of a hydroxy group of the PEG with a methyl group. Suitable methods for producing methoxy mPEGs are well know in the art and may use compounds such as methanol, methyl cellusolve, methyl carbitol, and the like. Again, mPEGs are designated by a number representing the average molecular weight, such as CARBOWAX® MPEG 5000, a registered trademark of Union Carbide Corporation for a methyl modified polyethylene glycol having a molecular weight of 5,000. Hereinafter, the term "PEG" will include PEGs and mPEGs.

Another class of compounds useful as oxyalkylene polymer additives in aqueous CCA solutions include polymers based on ethylene oxide (EO) and propylene oxide (PO) monomers, represented by the following general formula:

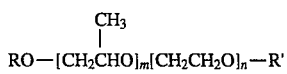

where R and R' can be hydrogen or an organic substituent having from 1 to 12 carbon atoms, preferably 1 to about 4 carbon atoms. Preferably, the organic substituents encompassed by R and R' are linear or branched alkyl groups. In addition, R', which end blocks or caps the EO:PO polymer backbone, can comprise an ether or ester linkage. The subscripts m and n have a value of zero or a positive number, provided the sum m+n is a positive number, typically not exceeding 1,000.

Methods for preparing the oxyalkylene polymers based on EO and PO monomers for use in the practice of the present invention are known to those skilled in the art. In addition, the starting materials, e.g. ethylene oxide, propylene oxide, butanol, glycerol and hydrogen, are commercially available.

The polymers based on EO:PO can be homopolymers, copolymers or terpolymers. The copolymers or terpolymers can be random, blocked or branched. The oxyethylene and oxypropylene units can be present in any order or sequence, and mixtures of various ratios of EO:PO polymers can be employed in the present invention. In a more preferred embodiment, the ratio of ethylene oxide monomers (EO) to propylene oxide monomers (PO) in the oxyalkylene polymer is in the range of from about 1:1 to about 3:1, with a most preferred ratio of EO:PO being 1:1. Again, the EO:PO oxyalkylene polymers useful in the practice of the present invention have hydroxyl numbers less than about 45.

With ratios having higher concentrations of PO present, from less than 1:1 EO:PO up to and including 0:1 EO to PO, it may be necessary to expose the wood to the additive using a process wherein the commercial CCA solution is diluted with water to the desired concentration and applied using convention techinques, followed by a separate impregnation step using the EO:PO oxyalkylene polymer additive having higher ratios of PO. Again, the preferred concentration of oxyalkylene polymer additives should be in the range of from about 1 to about 20 weight percent.

In another embodiment, a mixture of the above described PEGs with the above described EO:PO polymers may be used as the oxyalkylene polymer additives for aqueous wood-treating solutions. Although the mechanism is not fully understood, it is believed that an advantage is afforded by mixing the two types of additives. It is believed that the EO:PO polymers penetrate deeper into the wood where they are not readily leached out; whereas, PEG additives, which tend to remain closer to the surface of the wood, further prevent the EO:PO polymers from leaching from the wood. Although PEGs having molecular weights greater than 2,000 and hydroxyl numbers less than about 45 are preferred, when using these types of mixtures, it is also possible to mix lower molecular weight PEGs (i.e. PEGs with molecular weights less than about 2000, e.g. PEG 1000) with EO:PO polymers and still obtain improved performance.

Ratios for mixing PEGs with EO:PO polymers can vary over wide ranges depending on the desired performance characteristics of the wood-treating solutions. For example, it is believed that softness requirements may be met by using additive mixtures high in ratios of EO:PO polymers to PEGs; while it is believed that leaching stability requirements may be met by using higher ratios of PEGs to EO:PO polymers. Preferred ratios for mixtures include ranges of from about 10:1 PEG to EO:PO polymer, up to about 1:10 PEG to EO:PO polymer. A most preferred ratio is 3:1, PEG to EO:PO polymer.

Any of the above enumerated PEGs and EO:PO polymers may be mixed, however, most preferred mixtures include those containing PEG 1000, mPEG 5000, or PEG 8000, mixed with an EO:PO (1:1) polymer, in a ratio of 3:1

The hydroxyl number of any of the oxyalkylene polymer additives used in the present invention may be determined by methods known in the art. The hydroxyl number is the number of milligrams of potassium hydroxide equivalent to the hydroxyl content of one gram of the sample, and may be determined using conventional analytical techniques when the molecular weight of a compound is unknown, or may be estimated mathematically when the molecular weight is known. For example, the following formula may be used to calculate the approximate hydroxyl number of a compound of known molecular weight:

$$\frac{\text{\# of}}{\text{hydroxyl}} = \frac{\text{meq wt. of KOH (56100)}}{\text{avg. mol. wt. of compound/\# of OH groups}}$$

For example, PEG 1000, which has an average molecular weight of 1,000, and 2 hydroxy groups, would have a hydroxyl number approximately equal to 110.

Other compounds containing hydroxy groups and having hydroxyl numbers of less than about 45 may also be used in the practice of this invention, if they are chemically compatible with CCA solutions.

The total amount of oxyalkylene polymer additive used in CCA solutions generally ranges from about 1 to about 20 weight percent, preferably from about 2 to about 15 weight percent, and most preferably from about 4 to about 10 weight percent. The oxyalkylene polymer additives may be made up as 50% solutions which, when added to the a commercially available 50% CCA solution and diluted with water, result in wood-treating solutions containing the additives at the desired levels of from about 1 to about 20 weight percent in a 2.5% CCA solution.

As discussed earlier, one of the problems associated with the use of CCA solutions is that reducing agents or other additives in the CCA solutions tends to raise the pH of the solution above about 2, causing premature precipitation of chromated copper arsenate from the solutions prior to or during use. The oxyalkylene polymer additives of the present invention were evaluated to determine their stability in CCA solutions, as measured by change in pH and formation of a solid precipitate.

The CCA/oxyalkylene polymer additive solutions listed below in Table I are prepared by dissolving 40 grams of the oxyalkylene polymer additive in 910 grams of water prior to addition of 50 grams of an aqueous 50% CCA standard solution, obtained from Osmose Corporation, to make a final concentration of 4% additive in 2.5% CCA. The solutions were allowed to sit at room temperature for a period of time until a precipitate began to form, up to about eight (8) weeks.

The oxyalkylene polymer additives evaluated were obtained from Union Carbide Corporation and are as follows:

CARBOWAX® PEG 1000 (registered trademark of Union Carbide Corporation for polyethylene glycol, avg. mol. wt. 1,000; Comparative Example) in 2.5% CCA CARBOWAX® PEG 3350 (registered trademark of Union Carbide Corporation for polyethylene glycol, avg. mol. wt. 3,350) in 2.5% CCA CARBOWAX® MPEG 5000 (registered trademark of Union Carbide Corporation for modified polyethylene glycol with a single methyl group replacing the hydrogen atom of a hydroxy group at one end of the molecule, avg. mol. wt. 5,000) in 2.5% CCA CARBOWAX® PEG 8000 (registered trademark of Union (Carbide Corporation for polyethylene glycol, avg. mol. wt. 8,000) in 2.5% CCA CARBOWAX® PEG 20M (registered trademark of Union Carbide Corporation for polyethylene glycol, avg. mol. wt. 20,000) in 2.5% CCA POLYOX® WSR N-10 (registered trademark of Union Carbide Corporation for polyethylene glycol, avg. mol. wt. 100,000) in 2.5% CCA UCON®75H1400 (registered trademark of Union Carbide Corporation for water started 75:25/EO:PO copolymers, avg. mol. wt. 2,470, viscosity 1400 Saybolt Universal Seconds (SUS)) in 2.5% CCA UCON®50HB5100 (registered trademark of Union Carbide Corporation for butanol started 50:50/EO:PO copolymers, avg. mol. wt. 3,930, viscosity of 5100 SUS) in 2.5% CCA UCON®75H90000 (registered trademark of Union Carbide Corporation for water started 75:25/EO:PO copolymers, avg. mol. wt. 15,000, viscosity 90,000 SUS)) in 2.5% CCA

TABLE I

| Additive | Hydroxyl # | STABILITY # days[a] | Vol.[b] (ml) | pH Initial | pH Final[c] |
|---|---|---|---|---|---|
| PEG 1000 (Comparative Example) | 110 | 21 | 5 | 1.8 | 2.6 |
| PEG 3350 | 35 | 35 | 3 | 1.8 | 2.3 |
| MPEG 5000 | 11 | >56 | 0 | 1.8 | 2.2 |
| PEG 8000 | 8 | 42 | 2 | 1.8 | 2.2 |
| PEG 20M | 6 | 35 | 3 | 1.8 | 2.3 |
| WSR N-10 | 1 | >56 | 0 | 1.8 | 2.2 |
| 75H1400 | 46 | 21 | 4 | 1.8 | 2.5 |
| 50HB5100 | 15 | 35 | 2 | 1.8 | 2.3 |
| 75H90000 | 8 | 42 | 2 | 1.8 | 2.2 |

[a]number of days when CCA precipitate first appeared
[b]volume of CCA precipitate after 8 weeks
[c]pH of the solution after 8 weeks In addition to providing improved stability for CCA solutions containing additives, the oxyalkylene polymer additives of the present invention have been found to retard hardening effects associated with CCA solutions applied to wood. The types of wood that may be treated with these types of solutions are well known in the art and include red pine, southern yellow pine, jack pine, white pine, loblolly pine, cedar, douglas fir, poplar, beech, oak and the like. The most prevalent types of wood used in utility pole applications are red pine, southern yellow pine and jack pine.

The wood may be exposed to treatment with the CCA solution containing oxyalkylene polymer additives by one of the various techniques well known in the art, such as dipping, soaking, spraying, brushing, full cell and empty cell pressure impregnation, compression impregnation, and the like.

The most commonly used technique for treating wood with CCA solutions is a one-step pressure impregnation process whereby the CCA solution and any additive present are mixed prior to impregnation into the wood. The pressures generally range from about 25 psi to about 200 psi. The time required for complete penetration also varies with the species of wood, thickness of wood and pressure, but is typically from about 2 to about 12 hours.

In a wood-treating process wherein an additive has limited solubility in aqueous CCA solutions, such as with polymers based on EO:PO monomers in ratios having higher concentrations of PO, (i.e. from less than 1:1 EO:PO up to and including 0:1 EO:PO), it may be desirable to use more than one step. For example, in a two-step process, the CCA solution may be applied first, followed by a short fixation period prior to impregnation of the desired oxyalkylene additive. Even where the oxyalkylene polymer is not subject to significant solubility limitations, it may be desirable to utilize such a two-step process because it tends to produce better, or more advantageously controlled, distribution of the oxyalkylene additive. It has also been surprisingly found that such a two-step process provides a wood product subject to less leaching out of the CCA, which is desirable from the envirionmental point of view.

In the treatment of hard-to-treat species, such as oak, maple, teak, etc., it may be desirable to utilize a two-step method wherein the oxyalkylene material is impregnated into the wood, optionally followed by an appropriate residence time, before the CCA impregnation is performed. Without intending to be bound by any particular theory, it is believed that the oxyalkylene material serves to bulk the wood and open up the cell walls, thereby allowing better penetration of the CCA for better wood preservation.

The rate of absorption varies greatly with different species and timbers, thus, a particular technique used will be determined by such factors as the species of wood treated, the thickness and shape of the wood, the degree of treatment required, and others factors readily known to one in the art.

Numerous examples have been performed demonstrating the effectiveness of this invention. The following examples illustrate the invention, but should not be construed to limit the same.

EXAMPLES

The hardness of wood is measured by methods known in the art such as pilodyn penetration. Pilodyn penetration is measured as the distance a spike having a particular shape is driven into the wood under a predetermined load. Thus, the depth of penetration of the spike is directly proportional to increases in softness.

Logs used for evaluation are red pine (RP) and southern yellow pine (SYP) logs of about 20–35 centimeters in diameter and about 30– 180 centimeters in length. For each oxyalkylene polymer additive tested, an aqueous solution is prepared by dissolving the additive in water and adding it to the appropriate amount of 50% CCA solution and diluting with water to make a final concentration of 4% or 10% additive in 2.5% CCA solution. For example, 3.0 kg of an aqueous 50% CCA solution, 4.8 kg of a 50% solution of the oxyalkylene polymer additive and 52.2 kg of water are mixed to prepare a 60 kg wood-treating solution of 4% oxyalkylene polymer additive in 2.5% CCA solution.

Prior to treatment, the logs are prepared by painting each end with Endtite®, a water impermeable sealant, obtained from Coe Manufacturing Company, to prevent penetration of the treatment solution into the wood through cut surfaces. The treatment vessel for a small size log (20 cm×30 cm) is a 15-gallon size stainless steel high pressure vessel manufactured by Dominion Welding Engineering Co., Ontario, Canada. The treatment vessel is operated at 150 psig using compressed air and at ambient temperature. Logs are treated using the conventional "full cell" method whereby the log is placed inside the pressure vessel, vacuumed under reduced pressure for about 30 minutes, and pressurized for about 2 hours at about 150 psig after introduction of the wood-treating solution. After impregnation, excess solution is removed and the entire system vacuumed for an additional 30 minutes to complete treatment. After treatment, the logs are allowed to kiln dry at from about 60° C to about 80° C for up to 40 hours to approximate the original moisture level, and then stored at room temperature until use.

EXAMPLE 1

The following oxyalkylene polymer additive solutions were evaluated for effectiveness in reducing hardness of RP and SYP:

2.5% CCA (control)

4% CARBOWAX® PEG 1000 (polyethylene glycol, avg. mol. wt. 1,000, hydroxyl #110;Comparative Example)in 2.5% CCA 4% CARBOWAX® PEG 8000 (polyethylene glycol, avg. mol. wt. 8,000, hydroxyl #8) in 2.5% CCA 10% CARBOWAX® PEG 1000 (polyethylene glycol, avg. mol. wt. 1,000, hydroxyl #110; Comparative Example) in 2.5% CCA 10% CARBOWAX® PEG 8000 (polyethylene glycol, avg. mol. wt. 8,000, hydroxyl #8) in 2.5% CCA 10% CARBOWAX® MPEG 5000 (modified polyethylene glycol with a single methyl group replacing the hydrogen atom of a hydroxy group at one end of the molecule, avg. mol. wt. 5,000 hydroxyl #11) in 2.5% CCA 10% UCON®50HB5100 (butanol started 50:50/EO:PO copolymers, avg. mol. wt. 3,930, viscosity of 5100 SUS, hydroxyl #15) in 2.5% CCA

TABLE IIA

| | HARDNESS Red Pine | | | |
| --- | --- | --- | --- | --- |
| | Initial (mm) | After Treatment (mm) | % Increase in Softness (±) | % Moisture Content |
| CCA | 16.4* | 14.2* | −13 | 30–50 |
| 4% PEG 1000 (Comp. Ex.) | 16.1* | 17.2* | +7 | 40–50 |
| 4% PEG 8000 | 12.8 | 18.6 | +45 | 40–50 |

*Data obtained from Trumble & Messina, "CCA-PEG Pole Preservation Research," Proceedings 81st Annual Meeting American Wood-Preservers' Association, p. 203–213 (1985)

TABLE IIB

HARDNESS
Southern Yellow Pine

| | Initial (mm) | After Treatment (mm) | % Increase in Softness (±) | % Moisture Content |
|---|---|---|---|---|
| CCA | 13.3* | 12.0* | −10 | 30–50 |
| | 8 | 8 | 0 | 15–25 |
| 4% PEG 1000 (Comp. Ex.) | 13.3* | 11.4* | −14 | 35–45 |
| | 9 | 9 | 0 | 15–25 |
| 4% PEG 8000 | 14.2 | 15.7 | +11 | 30–50 |
| | 8 | 10 | +20 | 15–30 |
| 10% PEG 1000 | 14.2 | 11.6 | −18 | 30–50 |
| | 12 | 11 | −8 | 15–30 |
| 10% PEG 8000 | 11 | 16 | +45 | 15–30 |

*Data obtained from Trumble & Messina, "CCA-PEG Pole Preservation Research," Proceedings 81st Annual Meeting American Wood-Preservers' Association, p. 203–213 (1985)

EXAMPLE 2

From the above, it can be seen that comparative examples using 4% PEG 1000 perform better than comparative examples using 10% PEG 1000. Therefore, additional comparisons were made using 4% PEG 1000 as the comparative example versus oxyalkylene polymer additives of the present invention.

TABLE IIIA

HARDNESS
Red Pine

| | Initial (mm) | After Treatment (mm) | % Increase in Softness (±) | % Moisture Content |
|---|---|---|---|---|
| CCA | 14.0 | 13.0 | −7 | 20 |
| 4% PEG 1000 (Comp. Ex.) | 13.0 | 14.0 | +8 | 20 |
| 4% PEG 8000 | 13.0 | 17.0 | +31 | 20 |
| 10% MPEG 5000 | 14.0 | 20.0 | +43 | 20 |
| 10% 50HB5100 | 14.0 | 20.0 | +43 | 20 |

TABLE IIIB

HARDNESS
Southern Yellow Pine

| | Initial (mm) | After Treatment (mm) | % Increase in Softness (±) | % Moisture Content |
|---|---|---|---|---|
| CCA | 8.0 | 8.0 | 0 | 20 |
| 4% PEG 1000 (Comp. Ex.) | 9.0 | 9.0 | 0 | 20 |
| 4% PEG 8000 | 8.0 | 9.0 | +13 | 20 |
| 10% MPEG 5000 | 11.0 | 13.0 | +18 | 20 |
| 10% 50HB5100 | 11.0 | 15.0 | +36 | 20 |

EXAMPLE 3

By using oxyalkylene polymer additives of the present invention, an additional advantage is gained in that CCA solutions containing these additives resist leaching under harsh conditions including rain and high humidity.

Both RP and SYP logs are treated with 4% PEG 8000 in 2% CCA solutions using the application procedures described above. In addition, a comparative example was run by treating RP with a 4% PEG 1000 in 2% CCA solution and SYP with a 10% PEG 1000 in 2% CCA solution. After drying, the logs are placed in a conditioning chamber and subjected to six (6) weeks of continuous wetting from water sprinklers (to simulate rain), at room temperature and controlled humidity of approximately 100%. At the end of this period, the logs are removed from the conditioning chamber, and allowed to kiln dry at about 60° C. to about 80° C. to approximate the original moisture level.

Samples are taken from the logs prior to leaching and after leaching to determine the concentration of PEG remaining in the wood. Wood samples consists of approximately three (3) gram samples removed by boring to a depth of about 8 cm, at various top, middle, and bottom locations on the wood. The wood samples are then ground and extracted with 100 ml of water at 50° C. for 1 hour. The amount of PEG in the wood is determined by methods known in the art such as High Pressure Liquid Chromatography (HPLC). The results are shown in the following table as weight percent of PEG based on the weight of the sample extracted:

TABLE IVA

LEACHING
PEG 8000 Additive

| Wood Type | Before Leaching | After Leaching | % Retention |
|---|---|---|---|
| RP | 2.7 | 2.1 | 78 |
| SYP | 2.1 | 1.9 | 90 |

TABLE IVB

LEACHING
PEG 1000 Additive

| Wood Type | Before Leaching | After Leaching | % Retention |
|---|---|---|---|
| RP | 3.4 | 2.0 | 58 |
| SYP | 8.2 | 4.7 | 57 |

EXAMPLE 4

In another preferred embodiment of the present invention, oxyalkylene polymer additive mixtures of PEGs with EO:PO polymers are used to treat wood. The procedure of Example 2 was repeated using SYP and a 4% oxyalkylene polymer additive in 2.5% CCA. The following solutions were tested:

2.5% CCA (control)

3% CARBOWAX® PEG 1000+1% UCON®50HB5100 in 2.5% CCA

3% CARBOWAX® MPEG 5000+1% UCON®50HB5100 in 2.5% CCA

3% CARBOWAX® PEG 8000+1% UCON®50HB5100 in 2.5% CCA

TABLE V

HARDNESS - MIXTURES OF PEGs and SYNTHETIC EO:PO POLYMERS
SYP

|  | Initial (mm) | After Treatment (mm) | % Increase in Softness (±) | % Moisture Content |
|---|---|---|---|---|
| 2.5% CCA (Control) | 8 | 8 | 0 | 8 |
| PEG 1000 and 50HB5100 (3:1) | 8 | 10 | +25 | 10 |
| | 8 | 11 | +38 | 8 |
| MPEG 5000 and 50HB5100 (3:1) | 8 | 10 | +25 | 8 |
| | 8 | 11 | +38 | 8 |
| PEG 8000 and 50HB5100 (3:1) | 8 | 11 | +38 | 8 |
| | 8 | 11 | +38 | 8 |

What is claimed is:

1. A method of treating wood comprising the step of treating said wood with an aqueous wood-treating composition comprising a chromated copper arsenate (CCA) solution and at least one oxyalkylene polymer additive having a hydroxyl number of less than about 45 and a molecular weight greater than about 5,000, wherein the oxyalkylene polymer additive is polyethylene glycols, polymers based on ethylene oxide and propylene oxide monomers, or mixtures thereof.

2. A method of claim 1 wherein the terminal hydrogen of a hydroxy group of a polyethylene glycol is replaced with a linear or branched $C_1$–$C_{18}$ alkyl or aryl group.

3. A method of treating wood comprising the step of treating said wood with an oxyalkylene polymer additive having a hydroxyl number of less than about 45 and a molecular weight greater than about 5,000 followed by a separate step of treating said wood with an aqueous chromated copper arsenate (CCA) solution.

4. A method of treating wood comprising the step of treating said wood with an aqueous chromated copper arsenate (CCA) solution followed by a separate step of exposing said wood to an oxyalkylene polymer additive having a hydroxyl number of less than about 45 and a molecular weight greater than about 5,000.

5. A wood product produced by the method of claim 1.
6. A wood product produced by the method of claim 3.
7. A wood product produced by the method of claim 4.

* * * * *